United States Patent Office 2,697,694
Patented Dec. 21, 1954

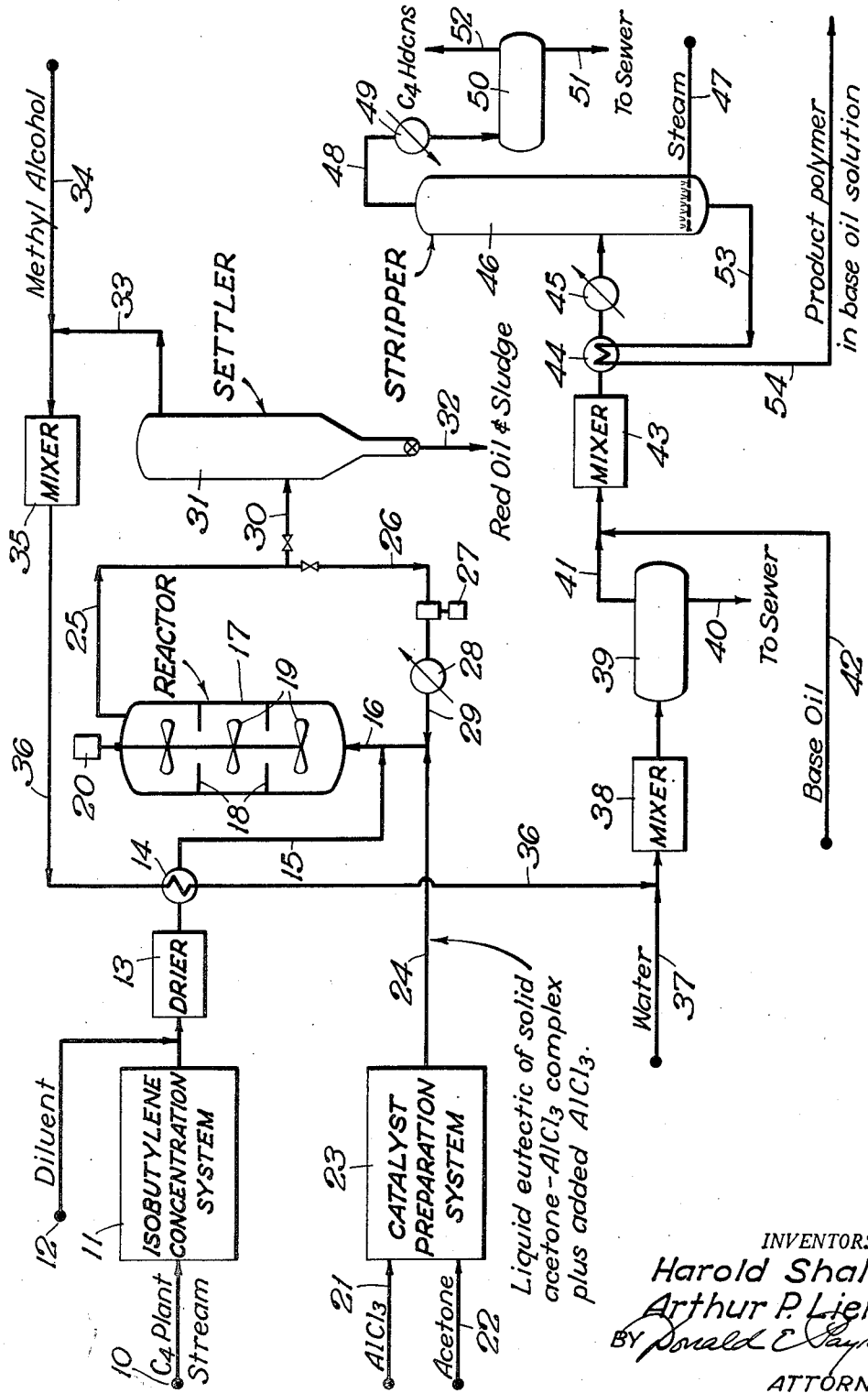

2,697,694

MANUFACTURE OF HIGH MOLECULAR WEIGHT POLYBUTENES

Harold Shalit, East Chicago, and Arthur P. Lien, Highland, Ind., assignors to Standard Oil Company, Chicago, Ill., a corporation of Indiana Application October 28, 1950, Serial No. 192,734

9 Claims. (Cl. 252—59)

This invention relates to olefin polymerization and it pertains more particularly to the manufacture of high molecular weight polybutenes having molecular weights of at least about 20,000, which polybutenes can be added in small amounts to lubricating oils for increasing their viscosity index and their resistance to leakage.

It has long been known that high molecular weight polybutenes (usually about 20,000 to 80,000 or more in molecular weight) are useful motor oil additives for improving viscosity index and resistance to leakage. Heretofore, such high molecular weight polybutenes have been produced by polymerizing isobutylene per se or isobutylene in admixture with small amounts of normal butenes, a diluent such as butane being employed in either case and the catalyst being solid aluminum chloride or a solution or slurry of aluminum chloride in a hydrocarbon or low boiling alkyl halide ($BF_3$ and a large number of other catalysts have also been proposed for this purpose). An object of our invention is to avoid the problem of handling solid catalyst and/or the problem of handling the large amounts of solvents which have heretofore been required. A further object is to provide a method and means for obtaining better control of the polymerization reaction, i. e. for directing the polymerization specifically to the production of the desired high molecular weight polymers. Other objects will be apparent as the detailed description of the invention proceeds.

We have discovered that a homogeneous liquid mixture formed by incorporating solid aluminum chloride in a solid ketone-aluminum chloride complex (particularly the acetone-aluminum chloride complex) is remarkably effective for the polymerization of olefins and particularly for the polymerization of isobutylene, either with or without a smaller amount of normal butenes, to produce polymers having molecular weights upwards of 20,000 (as distinguished from polymers of the lubricating oil range). It is known that low boiling polymers may be obtained by polymerizing isobutylene with aluminum chloride dissolved in acetone (U. S. 2,085,535) and it is also known that the action of an aluminum chloride catalyst may be killed by quenching with acetone (U. S. 2,099,090). It was most surprising, therefore, to discover that the presence of acetone in our catalyst mixture does not direct the polymerization toward the production of low molecular weight polymers and does not quench the reaction, but on the contrary directs the polymerization specifically toward the production of very high molecular weight polymers or plastics which are remarkably effective as motor oil addition agents.

An important feature of our invention is the use of a ketone (preferably acetone) aluminum chloride composition as a catalyst which composition contains a greater amount of aluminum chloride than would be present in a solid aluminum chloride-ketone complex (which contains about 55 weight per cent $AlCl_3$). The catalyst composition may be formed by adding aluminum chloride to acetone with constant stirring or agitation and at a temperature which is sufficiently low to prevent polymerization or other undesirable reaction of the acetone component. Aldehydes are not suitable for our process because they react vigorously when aluminum chloride is added even at low temperatures. Ethers give mixtures which are solid at room temperature. When aluminum chloride is added incrementally to acetone which is cooled in an ice water bath, the formation of a complex is soon evidenced by the presence of solids and when about 50 to 55 weight per cent of aluminum chloride has been added, the whole mass becomes solid. When additional aluminum chloride is added to this solid mass, there is a melting of the mass at the surface of the solid due to the formation of an aluminum chloride complex-aluminum chloride eutectic or due to the change of the composition of the complex mixture. Continued addition of aluminum chloride with sufficient mixing and stirring causes the entire mass to be reconverted to a mixture which is a homogeneous liquid at temperatures as low as —20° C. This liquid mixture, when decanted from excess undissolved $AlCl_3$, can thus be conveniently pumped from one part of the plant to another even in cold winter weather. At room temperature, the mixture is a mobile stable liquid which fumes slightly in moist air and reacts vigorously with water and other hydroxylic solvents such as methanol. The liquid mixture preferably contains an amount of aluminum chloride of about 70 to 73 weight per cent (approximately equimolar ratio of $AlCl_3$ to acetone) and is saturated with $AlCl_3$, but any amount of added $AlCl_3$ which will convert the solid complex to a homogeneous liquid may be used.

While the use of an acetone-aluminum chloride eutectic has previously been proposed as a catalyst for effecting alkylation and isomerization, its effectiveness as a polymerization catalyst was not recognized. We have discovered that it is remarkably effective as an olefin polymerization catalyst and particularly for the polymerization of isobutylene at temperatures in the vicinity of —50° C. when employed in amounts of about .1 to 15% or more by weight based on isobutylene charged. The amount of catalyst employed is dependent upon the temperature and the nature of the charging stock. Extremely low temperatures and/or the presence of appreciable amount of normal butenes require more catalyst than reactions effected at higher temperatures (e. g. the order of —50° C.) or reactions with smaller amounts of normal butenes. In some cases, the amount of $AlCl_3$ required is substantially less than would be required when aluminum chloride per se or an ordinary solution or slurry thereof is used as catalyst material.

Our invention will be more clearly understood from the following experimental data illustrating the effects of various amounts of catalysts for polymerizing pure isobutylene and normal butene mixtures at various temperatures and from the following detailed description of a specific example of our invention as applied to large scale commercial operation. The accompanying drawing, which forms a part of the specification, is a schematic flow diagram of a system for effecting a large scale commercial operation for producing several million gallons per year of a polybutene product suitable for use as a lubricating oil additive for increasing viscosity index and resistance to leakage.

With respect to the effect of temperature, a series of tests were made wherein 200 ml. of normal hexane was placed in a 500 ml. three-necked flask fitted with a stirrer and thermometer, the flask was cooled to the desired temperature and 50 grams of isobutylene were condensed therein to provide the test sample. The defined amount of our catalyst was then dropped into the test sample, any temperature rise was noted and the mixture was stirred for a period of one-half hour, at the end of which time the contents of the flask were immediately poured into excess methanol to precipitate the polymer. The polymer was washed with methanol and then freed of solvent by evacuation in a vacuum desiccator. In such tests wherein .15 gram of our catalyst (acetone-$AlCl_3$ complex saturated with added $AlCl_3$ to give a homogeneous liquid) was added in three separate tests at about —75° C., about —50° C. and about —25° C., respectively, the following data were obtained:

| Initial Temp., ° C. | Temp. Rise, ° C. | Percent Polymer Yield | Mol. Weight of Polymer |
|---|---|---|---|
| —76 | 0 | 1.3 | 98,000 |
| —52 | 7 | 29.5 | 240,000 |
| —24 | 6 | 6.4 | 59,000 |

The above data show that with the catalyst concentration and time of contact employed, there is a surprisingly large yield and high molecular weight obtained at a temperature of the order of −50° C. Ordinarily, it would be expected that molecular weight would increase with decrease in temperature. Since the above data were questioned by those skilled in the art, check runs were made using the same amount of catalyst at −54° C. and −24° C., respectively. The check test at −54° C. gave a polymer yield of 21% with a molecular weight of 219,000 and the check run at −24° C. gave a 10.1% polymer yield with a molecular weight of only 65,000. A further run at −75° C. was made using 3 grams of catalyst instead of .15 grams of catalyst and stirring for about 2½ hours instead of one-half hour. In this case a 90% polymer yield was obtained with a molecular weight of 132,000. Thus it is shown that greater yields can be obtained by employing a longer contact time and by increasing the amount of catalyst and that our catalyst is remarkably active at temperatures of the order of −50° C. to produce large yields of remarkably high molecular weight polymers even when the amount of catalyst is only .3%. In commercial practice, almost quantitative yields of such high molecular weight polymers can be obtained either by using small amounts of our catalyst and short contact times with recycling of unconverted isobutylene or by employing larger amounts of our catalyst and/or longer contact times.

The effect of a normal butene on the per cent polymer yield and polymer molecular weight was determined in a similar series of tests with each run at a temperature of −75° C., with 3 grams of our catalyst added in each instance. The data obtained from such tests are as follows:

| Weight Percent Butene-1 * | Weight Percent Polymer Yield | Mol. Weight |
| --- | --- | --- |
| 0 | 90 | 132,000 |
| 21 | 52 | 100,000 |
| 49 | 46 | 65,000 |
| 117 | 8 | 20,000 |

*Based on isobutylene.

By using 12 grams of catalyst with the sample containing 117 weight per cent butene-1, the polymer yield was increased to 53%. The above data show that increasing the amount of normal butene has a definite effect on reducing both polymer yield and polymer molecular weight. A normal $C_4$ refinery stream may contain only about 10 to 12% isobutylene and about 10% butene-1, 10% butene-2, 35% normal butane, 22% isobutane and the balance $C_3$ and $C_5$ hydrocarbons. Such a plant stream when contacted with about 6 weight per cent of our catalyst at −50° C. gave an undesirably low polymer yield and also an undesirably low molecular weight; in practicing our invention we therefore prefer to concentrate the isobutylene in the charge to the polymerization step in order to obtain a butylene stream which contains at least about twice as much isobutylene as normal butenes and which contains sufficient butanes (e. g. at least about 50 to 60%) to serve as diluent in the polymerization reaction.

In the above examples, the catalyst employed was an acetone-aluminum chloride mixture saturated with aluminum chloride and containing about 71 to 72% of aluminum chloride in its total composition; this is approximately, but slightly in excess of a 1:1 molar solution which would give only 69.7% $AlCl_3$. Our invention is not limited to acetone since methyl ethyl ketone likewise forms a solid complex with aluminum chloride which, on addition of further aluminum chloride, produces a homogeneous liquid which is apparently aluminum chloride dissolved in the methyl ethyl ketone-aluminum chloride complex. In this case, the weight per cent of aluminum chloride in the saturated solution was 66.6% which again is approximately, but slightly in excess of the amount of aluminum chloride that would be present in a 1:1 molar mixture. In a test made with a methyl ethyl ketone-aluminum chloride complex saturated with additional aluminum chloride to render it liquid, .3% of such catalyst with isobutylene charge at −50° C. gave a 6.5% yield of polymer having a molecular weight of 224,000. Thus, the methyl ethyl ketone catalyst is not as powerful a catalyst as the acetone catalyst but with larger amounts of catalyst and sufficient reaction time yields and molecular weights are obtainable which are comparable with those obtained with our preferred acetone catalyst.

Referring now to the commercial scale operation illustrated in the drawing, a $C_4$ hydrocarbon stream having the approximate composition hereinabove set forth is charged by line 10 to an isobutylene concentration system 11 in amounts of about 2400 barrels per day (42 gallon barrels). Most of this stream, e. g. about 2200 barrels per day, is contacted with sulfuric acid at a temperature of about 100° C. and a pressure of about 80 p. s. i. g. with sulfuric acid of about 65% strength in amounts of about 50 tons per stream day. Under these conditions, the acid absorbs chiefly isobutylene and only small amounts of normal butenes. The butylene enriched acid is then diluted with sufficient water to give an acid strength of about 45% and the diluted mixture is blown with 100 pound steam so that butylenes are removed therefrom at a temperature of about 250° F. and 65 p. s. i. g. The acid is reconcentrated to about 65% strength and fortified with about 1½ to 2 tons per day of 100% make-up acid. About 200 to 220 barrels per day of butylenes (chiefly isobutylene) thus recovered are blended with approximately 200 barrels per day of unextracted butane-butylene stream to give about 400 to 450, e. g. 420, barrels per day of a polymerization charging stock which contains at least twice as much isobutylene as normal butenes and which may contain about half as much butanes as total butenes. An approximately equal amount of paraffinic diluent may be added from an external source (e. g. butanes from an alkylation system) through line 12 to give a total feed of approximately 20 gallons per minute. If the feed contains any moisture, it is passed through calcium chloride drier 13. This charge then passes through heat exchanger 14 and lines 15 and 16 to reactor 17 which may be an insulated cylinder vessel about 4 feet in diameter by 12 feet or more in height and which is preferably provided with baffles 18 to prevent short circuiting and stirrers 19 driven by motor 20.

The catalyst is prepared by introducing aluminum chloride through line 21 and acetone through line 22 to catalyst preparation system 23. This preparation system may consist essentially of a cooled vessel into which aluminum chloride is introduced at the rate of about 1.4 to 1.5 tons per day and acetone is introduced at the rate of about 1000 to 1200 pounds per day. Various methods of introduction may be employed, but it is preferred to maintain a storage vessel containing an excess of undissolved aluminum chloride at its base and a liquid mixture consisting of about 73% of aluminum chloride and 27% acetone in contact with the undissolved aluminum chloride so that the mixture will always be saturated with aluminum chloride. A part of this liquid mixture may be withdrawn and pumped through mixing means into which incremental amounts of aluminum chloride and acetone are added, but it should be understood that the invention is not limited to any particular mixing sequence or mixing means. The saturated homogeneous liquid mixture is withdrawn from the catalyst preparation system through line 24 at the rate of approximately 3 pounds per minute and thence introduced through line 16 to reactor 17. It should be noted that only about 3 pounds per minute of catalyst is employed and that this catalyst is a homogeneous liquid which can be easily handled and transported and which is almost instantaneously dispersed in the reaction mixture.

The polymerization reaction is preferably effected at a temperature of about −50° C., i. e. about −50 to −60° F., during upflow of the charging stock stream and catalyst through the reactor which may be about 4 feet in diameter by 12 to 20 feet in height. The effluent from the reactor which is withdrawn through line 25 may be at a temperature of about −40° F. and about 130 gallons per minute of such effluent is recycled by lines 26 and pump 27 through cooler 28 wherein it is cooled to a temperature of about −70° F. (or −60° C.), thence returned by lines 29 and 16 to the reactor. The amount of the aliquot portion of the effluent stream thus recycled may be varied over a considerable range and the cooling of the recycled portion is preferably effected by an ethylene refrigeration system which provides a cooling temperature of about −150° F. We prefer to introduce a catalyst stream into the recycled material before it contacts the fresh feed.

The remainder of the reactor effluent is discharged through line 30 into settler 31 from which red oil, sludge, etc, is removed by line 32. This removed material may be treated in known manners to recover desired hydrocarbon components and catalyst components for reuse and/or a part thereof may be recycled to the reactor.

The clear overhead stream from the top of settler 31 is withdrawn through line 33 and quenched with methyl alcohol introduced at the rate of about 2 gallons per hour through line 34, the combined stream passing through mixer 35 to insure intimate contact and quenching of any residual catalyst while the product is still at a temperature of about −40° C. The quenched mixture then passes by line 36 through heat exchanger 14, and to the stream warmed in the heat exchanger is added about 10 gallons per minute of water from line 37, the water being intimately mixed with the product stream in mixer 38 and then settled from the product stream in settler 39 which may operate at substantially polymerization pressure (100 p. s. i. g.) and at ordinary room temperature. The water, alcohol, and small amount of removed catalyst is withdrawn from the system through line 40.

To the washed product stream withdrawn from settler 39 through line 41 is added a base oil which is introduced by line 42 at the rate of about 9 to 10 gallons per minute, the base oil being intimately admixed with the washed product stream in mixer 43. The mixture then passes through heat exchanger 44 and heater 45, where it is heated to about 320° F., to flash tower or stripper 46, which in this example operates at about 70 p. s. i. g. with 400 pound steam being introduced through line 47 to insure removal of all low boiling hydrocarbons. The overhead from the flash tower or stripper is withdrawn through line 48 and condenser 49 to receiver 50 from which condensed water is withdrawn through line 51 and condensed hydrocarbons are withdrawn through line 52.

The hot product is withdrawn from the base of tower 46 through line 53, passed through heat exchanger 44 and sent to storage through line 54.

While we have thus described a particular example of our invention in considerable detail, it should be understood that our invention is not limited to the specific flow sheet, quantities or operating conditions therein described. As previously pointed out, the amount of catalyst required is dependent to a considerable extent on the nature of charging stock and by decreasing the amount of normal butenes present in the charge, the amount of catalyst may likewise be markedly decreased. The molecular weight of the polymer may be controlled by using more or less normal butenes in the charging stock and/or by using higher or lower polymerization temperatures. The time of reaction may be controlled by varying the size of the reactor or by recycling varying amounts of the aliquot portion of reactor effluent. Yields may be increased by employing larger amounts of catalyst and/or by employing longer contact times at the low temperatures.

Instead of quenching the product stream with methyl alcohol, other quenching agents may be employed as taught, for example, in U. S. 2,099,090. Acetone itself may be employed as a quench liquid and if employed in the carefully controlled amounts required to form a solid complex with dissolved aluminum chloride, such solid complex may be filtered or otherwise separated from the product stream and employed as a part of make-up catalyst with sufficient additional aluminum chloride to produce our homogeneous liquid catalyst. Many other such modifications and alternative procedures will be apparent to those skilled in the art from the above description.

While our invention is uniquely applicable to the preparation of high molecular weight polymers from isobutylene or butene mixtures consisting predominantly of isobutylene, it should be understood that other olefins may be polymerized with our catalyst, the operating conditions being dependent in each case on the nature of the charging stock and the desired molecular weight of the resulting polymer. From the foregoing, it will be apparent that we have accomplished the objects of our invention.

We claim:
1. The method of effecting olefin polymerization, which method comprises contacting an olefin charging stock at a temperature below −25° C. with a catalyst consisting essentially of a homogeneous ketone-aluminum chloride mixture containing more aluminum chloride than would be required to produce a solid ketone-aluminum chloride complex and sufficient aluminum chloride to produce a homogeneous liquid mixture containing more than about 55 weight per cent aluminum chloride but not more than about 73 weight per cent aluminum chloride, said ketone being selected from the class consisting of acetone and methylethyl ketone.

2. The method of claim 1 wherein the ketone is acetone.

3. The method of polymerizing an olefin charging stock in which the olefin content consists chiefly of isobutylene, which method comprises contacting said charging stock at a temperature in the range of about −25° C. to −75° C. with a catalyst consisting essentially of a liquid mixture of aluminum chloride dissolved in a normally solid ketone-aluminum chloride complex, said ketone being selected from the class consisting of acetone and methylethyl ketone.

4. The method of claim 3 wherein the ketone is acetone.

5. The method of producing butylene polymers having a molecular weight upwards of 20,000, which method comprises preparing a charging stock stream containing isobutylene with a smaller amount of normal butenes in an inert hydrocarbon diluent, contacting said stream at a temperature in the range of about −25° C. to −75° C. with a homogeneous liquid catalyst consisting of an approximately equimolar amount of a ketone and aluminum chloride for a period of time sufficient to obtain substantial conversion, quenching the polymerization products at low temperature and washing the quenched product to remove residual catalyst material therefrom, said ketone being selected from the class consisting of acetone and methylethyl ketone.

6. The method of polymerizing isobutylene, which method comprises contacting said isobutylene in the presence of a hydrocarbon diluent at a temperature in the vicinity of −50° C. with an effective amount of a catalyst consisting essentially of a homogeneous liquid prepared by incorporating in a ketone-aluminum chloride mixture an amount of aluminum chloride greater than would be required for producing a solid $AlCl_3$-ketone complex, said ketone being selected from the class consisting of acetone and methylethyl ketone.

7. The method of claim 6 wherein the ketone is acetone.

8. The method of claim 6 wherein the catalyst consists essentially of an acetone-aluminum chloride mixture in the form of a mobile liquid at ordinary temperature, which liquid is substantially saturated with aluminum chloride and contains approximately an equimolar amount of aluminum chloride.

9. The method of producing a lubricating oil additive for improving viscosity index and resistance to leakage, which method comprises contacting a refinery stream of $C_4$ hydrocarbons which contains more normal butenes than isobutylene with sulfuric acid of about 65% concentration to selectively absorb isobutylene therein, separating said enriched acid and diluting it to about 45% strength and heating it to obtain an olefin mixture predominating in isobutylene, adding diluent low boiling hydrocarbons to provide a charging stock stream containing at least about 50% of diluent, cooling said charging stock stream and contacting said stream at a temperature in the range of −25° C. to −75° C. with a catalyst which is a homogeneous liquid at normal temperatures and which consists of an amount of aluminum chloride in an aluminum-chloride acetone mixture which is greater than the amount required to form a solid acetone-aluminum chloride complex, separating immiscible catalyst material from the resulting product stream, quenching the remaining product stream at low temperature, washing the quenched product stream, incorporating a base oil into the washed stream to provide a carrier for the polymer and stripping low boiling hydrocarbons from the polymer product while it is incorporated in said base oil.

References Cited in the file of this patent

UNITED STATES PATENTS

| Number | Name | Date |
| --- | --- | --- |
| 2,085,535 | Langedijk | June 29, 1937 |
| 2,142,980 | Huijser | Jan. 3, 1939 |
| 2,422,798 | Pines | June 24, 1947 |
| 2,515,138 | Schutze | July 11, 1950 |
| 2,520,439 | Sailors | Aug. 29, 1950 |
| 2,525,788 | Fontana et al. | Oct. 17, 1950 |